(12) United States Patent
Hoerentrup et al.

(10) Patent No.: US 9,354,783 B2
(45) Date of Patent: May 31, 2016

(54) METHOD FOR REPRESENTING ANIMATED MENU BUTTONS

(71) Applicant: THOMSON LICENSING, Issy de Moulineaux (FR)

(72) Inventors: Jobst Hoerentrup, Wenningsen (DE); Dirk Gandolph, Ronnenberg (DE); Ralf Ostermann, Hannover (DE); Harald Schiller, Hannover (DE); Hui Li, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/608,835

(22) Filed: Jan. 29, 2015

(65) Prior Publication Data

US 2015/0149903 A1    May 28, 2015

Related U.S. Application Data

(63) Continuation of application No. 12/653,252, filed on Dec. 10, 2009, now Pat. No. 8,990,694, which is a continuation of application No. 10/550,262, filed on Sep. 22, 2005, now Pat. No. 7,653,882.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/04842* (2013.01); *G06T 13/80* (2013.01);
(Continued)

(58) Field of Classification Search
CPC .................................... G06F 3/0482

USPC .................. 715/720, 716, 719, 721, 810, 825
See application file for complete search history.

(56) References Cited

U.S. PATENT DOCUMENTS 5,428,730 A * 6/1995 Baker et al. .................... 715/740
5,432,932 A * 7/1995 Chen et al. .................... 718/103
(Continued)

FOREIGN PATENT DOCUMENTS

| CN | 1291336 | 4/2001 |
|---|---|---|
| EP | 0898279 | 2/1999 |

(Continued)

OTHER PUBLICATIONS

Franklin, Flash 5! Creative Web Animation, published Dec. 22, 2000 by Macromedia Press, pp. 1-11.

(Continued)

*Primary Examiner* — Andrey Belousov
(74) *Attorney, Agent, or Firm* — Robert D. Shedd; Reitseng Lin

(57) ABSTRACT

Optical storage media often contain data structures for a menu suitable for selection of a title, a chapter, a parameter or others. Such menus usually comprise a number of buttons to be displayed, with each button having a state. Possible states of buttons are "unselected", "selected" or "activated". According to the invention, the representation of a menu button may vary, depending on its state. An image or an image sequence, e.g. cartoon, may be associated to a buttons state, providing user animation. Further, a sound or sound sequence, e.g. melody or click, may be associated to a buttons state, and may be played back when the button enters this state. A data structure is disclosed which allows storage of such menu data e.g. on a Blu-ray disc.

2 Claims, 1 Drawing Sheet

(51) Int. Cl.

| | | |
|---|---|---|
| *G11B 19/02* | (2006.01) | |
| *H04N 5/445* | (2011.01) | |
| *H04N 21/431* | (2011.01) | |
| *H04N 21/482* | (2011.01) | |
| *G06F 3/0484* | (2013.01) | |
| *G06T 13/80* | (2011.01) | |
| *H04N 21/41* | (2011.01) | |
| *H04N 21/47* | (2011.01) | |
| *H04N 21/488* | (2011.01) | |

(52) U.S. Cl.
CPC ............ *G11B 19/025* (2013.01); *H04N 5/445* (2013.01); *H04N 21/4312* (2013.01); *H04N 21/482* (2013.01); *H04N 21/4104* (2013.01); *H04N 21/47* (2013.01); *H04N 21/488* (2013.01)

(56) References Cited

U.S. PATENT DOCUMENTS

| | | |
|---|---|---|
| 5,648,813 A | 7/1997 | Tanigawa et al. |
| 6,285,351 B1 | 9/2001 | Chang et al. |
| 6,389,221 B1 | 5/2002 | Saeki et al. |
| 6,469,718 B1 | 10/2002 | Setogawa et al. |
| 7,403,695 B2 | 7/2008 | Kikuchi et al. |
| 2001/0020958 A1 | 9/2001 | Yoo et al. |
| 2001/0048448 A1 | 12/2001 | Raiz et al. |
| 2002/0047835 A1 | 4/2002 | Kawai et al. |
| 2002/0054101 A1 | 5/2002 | Beatty |
| 2002/0109719 A1 | 8/2002 | Hata et al. |
| 2002/0172496 A1 | 11/2002 | Gunji et al. |

FOREIGN PATENT DOCUMENTS

| | | |
|---|---|---|
| EP | 1052644 | 11/2000 |
| EP | 1113442 | 7/2001 |
| JP | 04172496 | 11/1990 |
| JP | 07036654 | 2/1995 |
| JP | 7322226 | 12/1995 |
| JP | 11215466 | 8/1996 |
| JP | 11069284 | 3/1999 |
| JP | 2000132953 | 10/2000 |
| JP | 2001054066 | 2/2001 |
| JP | 2001238278 | 8/2001 |
| JP | 2002092656 | 3/2002 |
| JP | 2002238032 | 8/2002 |
| JP | 2002252826 | 9/2002 |
| JP | 2002278658 | 9/2002 |
| JP | 2002351618 | 12/2002 |
| WO | WO02071197 | 12/2002 |

OTHER PUBLICATIONS

Toot, "Flash 5! In an Instant," Published in Aug. 2001 by IDG Books, http://www.thattechnicalbookstore.com/b0764546249.htm, pp. 1-16.

Microsoft Windows XP Professional Version 2002 Service Pack 2, pp. 1-2.

\* cited by examiner

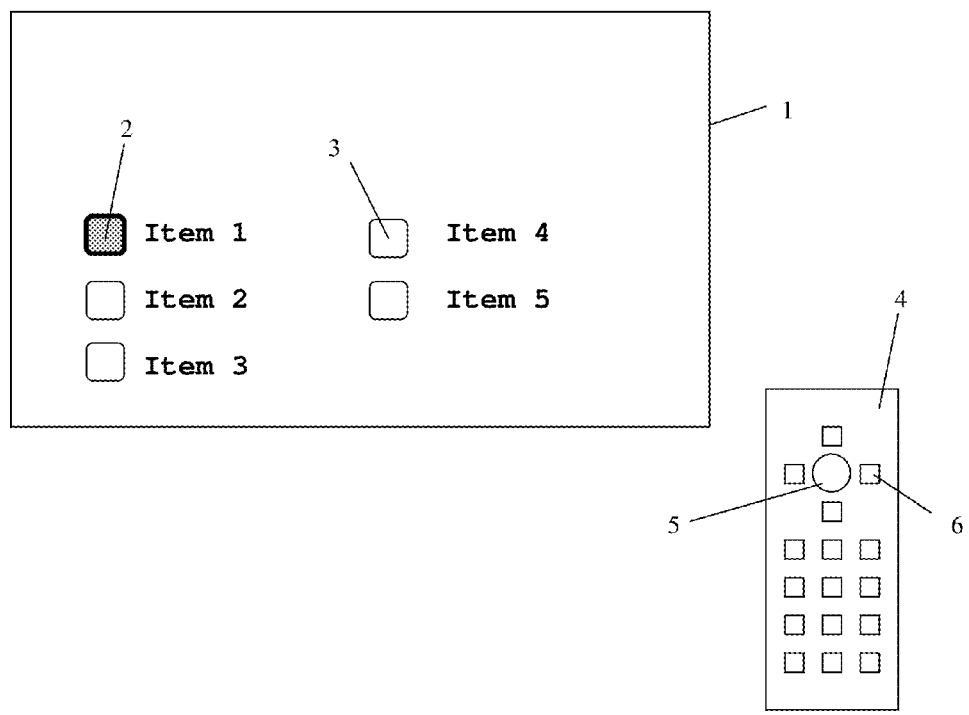

METHOD FOR REPRESENTING ANIMATED MENU BUTTONS

FIELD OF THE INVENTION

This application is a continuation of co-pending U.S. application Ser. No. 12/653,252, filed Dec. 10, 2009, which is a continuation of U.S. application Ser. No. 10/550,262, filed Sep. 22, 2005, now issued as U.S. Pat. No. 7,653,882, incorporated by reference herein.

BACKGROUND

Today's optical storage media formats are capable of supporting visual menus, e.g. for content management or control functions. Applications of such visual menus are the selection of one out of multiple titles on the disc, the selection of a chapter within a title, and others. From the user perspective, such menus consist of a number of buttons shown on the display. The user may navigate within the menu, e.g. by pushing the up, down, left and right buttons on his remote control to select a menu button, and may activate a menu button through some kind of "OK" button on the remote control. An indicator, usually a highlight or an arrow, may provide feedback to the user, showing which button is currently selected or activated. A menu button may have one of the states "normal", "selected" or "activated".

However, known DVD menus are rather limited concerning extra features, since they contain only static visual buttons.

Further, a subtitling specification contained in the document "ETS 300 743: Digital Video Broadcasting (DVB); Subtitling System" (DVB-ST), provided by the European Telecommunication Standardization Institute (ETSI), is known for embedding subtitles into video sequences.

SUMMARY OF THE INVENTION

The present invention may be utilized to give more feedback to the user who operates a menu related to an optical storage medium. The feedback comprises visually and/or aurally animated buttons.

A storage medium that contains an animated menu is disclosed.

An apparatus suitable for presenting such menu is disclosed.

According to the invention, a menu button shown on a display may look different, depending on its state. The state may be "normal", "selected" or "activated", and for each of these states the button may have different color or shape. Additionally, a sound or sound sequence may be attached to some or all menu buttons, depending on the buttons state. Examples for sounds are a click or a melody, or a speech sequence. The current invention provides a data structure by which those additional features can be described.

Advantageous embodiments of the invention are disclosed in the following description and the figure.

BRIEF DESCRIPTION OF THE DRAWING

An exemplary embodiment of the invention is described with reference to the accompanying drawing in FIG. 1, which shows an on-screen menu according to the invention, and a corresponding remote control.

DETAILED DESCRIPTION OF THE INVENTION

FIG. 1 shows a video screen 1 containing a menu that comprises buttons 2,3 and related text describing the buttons. When a user presses a button 5,6 on a remote control 4, the state of a button 2,3 may change, and also the representation of the button. In FIG. 1 one button 2 is selected, and thus looks different from the unselected buttons 3. When the user e.g. presses the "right" button 6 on the remote control, another button 3 is selected being right from the currently selected button 2. When the user presses the "OK" button 5, the selected button is activated, and the function associated with the selected button is performed. The selected button 2 according to the invention is animated, e.g. has another color and another shape than an unselected button 3, and its color or shape may change. Particularly, the button may also be replaced by a moving symbol, a moving cartoon or the like, depending on the state.

A preferred embodiment of the invention is based on the syntax and semantics of the subtitling specification contained in the document "ETS 300 743: Digital Video Broadcasting (DVB); Subtitling System" (DVB-ST), provided by the European Telecommunication Standardization Institute (ETSI). To provide enhanced capabilities for menus relating to optical storage media, the page composition segment defined in DVB-ST is extended to describe animated menu buttons and to associate a sound or sound sequence to a button. The enhanced page composition segment is herein called a "menu page composition segment".

This invention, like DVB_ST, uses page composition segments to describe the position of one or more rectangular regions on the display, assuming that a region contains a representation of one button in a certain state, e.g. as pixel data or bitmap. Each button image is thus addressable through an identifier (ID), or "region_id". In this embodiment of the invention, backward compatibility is kept with DVB-ST by using an associated segment type ID for the menu page composition segment. The menu page composition segment is defined as listed in Tab.1.

The "menu page composition segment" according to the invention may also replace the original page composition segment, e.g. in DVB-ST. A menu page composition segment describes a menu and provides the necessary layout and timing information as well as additional control information.

In one embodiment of the invention, being a simple case with static menus, each button is represented by e.g. three images. A first image represents the button in the "normal" state, a second image represents the button in the "selected" state and a third image represents the button in the "activated" state. These images may be stored e.g. as bitmap files on the storage medium, and may be used to display the menu.

In another embodiment, going beyond static menus, the menu page composition segment also allows to describe animated buttons. In this case, the "normal" state and the "selected" state of a button are each represented through a series of images that are displayed, and may be e.g. cyclically repeated, on the screen to achieve the animation effect. Also for the "activated" state of a button an animation can be defined, but here it may be advantageous to display the animation phases only once, because the menu will usually disappear or be modified after a button was activated.

For all button animations of a menu the menu author can specify an animation frame rate, defining how long each phase of an animation is displayed.

Advantageously, the invention also provides the possibility to give aural feedback to the user. If a button is either in the "selected" state or in the "activated" state, it may be assigned a sound identifier associated with a sound, which may be stored on the storage medium. The associated sound is played back when the button enters the respective button state. In one embodiment of the invention the associated sound is played back repeatedly, as long as the button is in the respective state.

The structure of the menu page composition segment and the semantics of the fields of the menu page composition segment are based on the structure and semantics given in DVB-ST, Section 7.2.1 "Page composition segment". Additional semantics definitions are used for an enhanced menu according to the invention.

Tab.1 shows the structure of a menu page composition segment according to the invention. Lines 1-8 are identical to the subtitle segment of the DVB-ST standard, giving the possibility to keep backward compatibility. The meaning of the fields shown in Tab.1 is described in the following. The addressing of pixels is based on a coordinate system whose origin is defined by the top-left corner of the associated video screen. Pixel addresses increase from left to right and from top to bottom. The dimensions of the associated video are defined as video_width*video_height.

TABLE 1

Syntax of a menu page composition segment
A segment is generally a data unit within the storage area.
The segment_type defines its type. The menu page composition
segment may be identified by setting e.g. segment_type = 0x18,
since this value is not used in DVB-ST yet. The other fields
in lines 2-8 of Tab.1 define the segment data set.

| | Field | Size | Type |
|---|---|---|---|
| 1 | menu_page_composition_segment ( ) { | | |
| 2 | sync_byte | 8 | bslbf |
| 3 | segment_type | 8 | bslbf |
| 4 | page_id | 16 | bslbf |
| 5 | segment_length | 16 | uimsbf |
| 6 | page_time_out | 8 | uimsbf |
| 7 | page_version_number | 4 | uimsbf |
| 8 | page_state | 2 | bslbf |
| 9 | animation_frame_rate_code | 4 | uimsbf |
| 10 | reserved | 6 | bslbf |
| 11 | while (processed_length < segment_length) { | 8 | uimsbf |
| 12 | button_number | 16 | uimsbf |
| 13 | button_horizontal_address | 16 | uimsbf |
| 14 | button_vertical_address | | |
| 15 | neighbour_info( ) | 8 | uimsbf |
| 16 | upper_button_number | 8 | uimsbf |
| 17 | lower_button_number | 8 | uimsbf |
| 18 | left_button_number | 8 | uimsbf |
| 19 | right_button_number | | |
| 20 | normal_state_info( ) | 8 | uimsbf |
| 21 | start_region_id_normal | 8 | uimsbf |
| 22 | end_region_id_normal | 8 | uimsbf |
| 23 | selected_state_info( ) | 16 | uimsbf |
| 24 | start_region_id_selected | 8 | uimsbf |
| 25 | end_region_id_selected | 8 | uimsbf |
| 26 | action_state_info( ) | | |
| 27 | start_region_id_activated | 8 | uimsbf |
| 28 | end_region_id_activated | 8 | uimsbf |
| 29 | button_command_info( ) | | |
| 30 | sound_info( ) | | |
| 31 | selected_sound_id | 8 | uimsbf |
| 32 | activated_sound_id | 8 | uimsbf |
| 33 | } | | |
| 34 | } | | |

The animation_frame_rate_code field specifies the frame rate of animations in the case of animated buttons being used. It applies to a range of regions specified by start_region_id_xxx and end_region_id_xxx, with the "xxx" referring the state of a button. If a start_region_id_xxx and its corresponding end_region_id_xxx differ, they define a range of regions that shall be presented with this animation frame rate. For the normal and selected state, the presentation may be cyclically repeated; for the "activated" state, the presentation shall be performed only once. When any start_region_id_xxx is identical to the associated end_region_id_xxx, this designates a static or non-animated button state. Only the region designated by start_region_id_xxx is displayed, and for that button state the animation_frame_rate_code shall have no meaning.

Tab.2 shows an exemplary list of animation_frame_rate_codes. An animation may be visible at full video frame rate, e.g. 30 pictures per second, meaning that with each video frame another phase of the animation is displayed. It may also be sufficient to display only with every other video frame another phase of the animated button, thus achieving another effect. Further, it is possible to define the frame rate to either be relative or absolute. Therefore the values of the animation_frame_rate_code field have two different meanings, depending on if an associated video is present. In this case the animation_frame_rate_code gives the animation frame rate relative to the video frame rate, otherwise it gives the absolute frame rate.

TABLE 2

Example of animation_frame_rate_code

| animation_frame_rate_code | Relative animation frame rate | Abs. animation Frame rate |
|---|---|---|
| 0x0 | Reserved | Reserved |
| 0x1 | Full video frame rate | 30 Hz |
| 0x2 | ½ of video frame rate | 15 Hz |
| 0x3 | ¼ of video frame rate | 8 Hz |
| 0x4 | ⅛ of video frame rate | 4 Hz |
| 0x5 | 1/16 of video frame rate | 2 Hz |
| 0x6 | 1/32 of video frame rate | 1 Hz |
| 0x7-0xF | reserved | Reserved |

The button_number field specifies a number that is an internal identifier for a button, and is used for the fields defined below, e.g. the neighbour_info( ) field. Additionally, when button_number is entered directly through the user interface (UI), the associated button may be activated. Therefore a button_number is unique within the menu. It may be e.g. a two-digit number in the range between 0 and 99.

Some fields used for menu animation according to the invention must be specified separately for each button. They are listed from line 11 of Tab.1, where a loop over all buttons starts. Each instance of the loop refers to one button. Implicitly, the first instance of the while-loop within menu_page_composition_segment( ) may be considered as "selected" when entering the menu, and may be considered as "activated" if a page timeout for the menu is set and becomes active.

The button_horizontal_address field specifies the horizontal address of the top left pixel of the button. The specified horizontal position may be in between 0 and video_width-1. Likewise, the button_vertical_address field specifies the vertical address of the top left pixel of the button. The specified vertical position may be in between 0 and video_height-1.

The upper_button_number field specifies the button to be selected when the user navigates upward from the current button. The lower_button_number field specifies the button to be selected when the user navigates downward from the current button. The left_button_number field specifies the button to be selected when the user navigates left from the current button. And the right_button_number field specifies the button to be selected when the user navigates right from the current button.

The start_region_id_normal field specifies the ID of the first region to be presented for a button presentation in normal state, and the end_region_id_normal field specifies the ID of the last region to be presented for a button presentation in normal state. All regions with an ID between and including start_region_id_normal and end_region_id_normal shall exist; if start_region_id_normal differs from end_region_id_normal, that range of regions shall be presented cyclically with the animation frame rate as defined by animation_frame_rate_code.

The start_region_id_selected field specifies the ID of the first region to be presented for a button presentation in the selected state, and the end_region_id_selected field specifies the ID of the last region to be presented for a button presentation in the selected state. All regions with IDs between start_region_id_selected and end_region_id_selected shall exist; if start_region_id_selected differs from end_region_id_selected, that range of regions shall be presented cyclically with the animation frame rate described by animation_frame_rate_code.

The start_region_id_activated field specifies the ID of the first region to be presented for a button presentation in activated state, and the end_region_id_activated field specifies the ID of the last region to be presented for a button presentation in activated state. All regions with IDs between start_region_id_activated and end_region_id_activated shall exist; if start_region_id_activated differs from end_region_id_activated, that range of regions shall be presented once with the animation frame rate described by animation_frame_rate_code.

The button_command_info( ) field serves as a container for commands associated with this button, specifying the commands to be performed when the button is activated.

Finally, the selected_sound_id field specifies the ID of the sound to be played when the button enters the "selected" state, and the activated_sound_id field specifies the ID of the sound to be played when the button enters the "activated" state.

The invention may be used particularly for menus stored on Blu-ray discs, but also DVD or other optical or non-optical high-capacity storage media.

The invention claimed is:

1. A non-transitory computer readable storage medium having stored thereon at least video data and a data segment representing control data for an on-screen menu for controlling a presentation of said video data, wherein said control data are suitable for controlling a display that operates at a video frame rate to display said on-screen menu, and wherein the menu comprises menu buttons having one out of three states, the states being normal, selected and activated, and said control data comprise image data for representing said menu buttons in said states and neighbor information, and wherein the image data that represent a particular menu button state on a display comprise a sequence of pictures, wherein a value representing a rate for animating the sequence of pictures is stored on said storage medium and represents said rate for animating the sequence of pictures relative to said video frame rate, and said rate for animating the sequence of pictures depends on the video frame rate and said value, and said rate for animating is different from the video frame rate and is an integer fraction of the video frame rate and is lower than the video frame rate, and wherein said sequence of pictures comprised in the image data that represent a particular menu button state on the display is animated at said rate for animating the sequence of pictures, and wherein the neighbor information comprises an upper button number, a lower button number, a right button number and a left button number.

2. An apparatus having a processor configured for displaying a menu on a screen, the menu comprising menu buttons and being controlled by menu data read from a computer readable storage medium, wherein the computer readable storage medium has stored thereon at least video data and a data segment representing control data for an on-screen menu for controlling a presentation of said video data, wherein said control data are suitable for controlling a display that operates at a video frame rate to display said on-screen menu, and wherein the menu comprises menu buttons having one out of three states, the states being normal, selected and activated, and said control data comprise image data for representing said menu buttons in said states and neighbor information, and wherein the image data that represent a particular menu button state on a display comprise a sequence of pictures, wherein a value representing a rate for animating the sequence of pictures is stored on said storage medium and represents said rate for animating the sequence of pictures relative to said video frame rate, and said rate for animating the sequence of pictures depends on the video frame rate and said value, and said rate for animating is different from the video frame rate and is an integer fraction of the video frame rate and is lower than the video frame rate, and wherein said sequence of pictures comprised in the image data that represent a particular menu button state on the display is animated at said rate for animating the sequence of pictures, and wherein the neighbor information comprises an upper button number, a lower button number, a right button number and a left button number.

* * * * *